United States Patent
Kawabe

[11] Patent Number: 6,162,654
[45] Date of Patent: Dec. 19, 2000

[54] DISPLAY AND METHOD OF PRODUCING THE DISPLAY

[75] Inventor: Masahiko Kawabe, Hashima, Japan

[73] Assignee: Sanyo Electric Co., Ltd., Osaka, Japan

[21] Appl. No.: 09/077,184

[22] PCT Filed: Nov. 29, 1995

[86] PCT No.: PCT/JP95/02431

§ 371 Date: May 21, 1998

§ 102(e) Date: May 21, 1998

[87] PCT Pub. No.: WO97/20251

PCT Pub. Date: May 6, 1997

[51] Int. Cl.[7] .......................... H01L 21/00; G02F 1/1335; G02F 1/1333; G02F 1/136

[52] U.S. Cl. ............................ 438/30; 349/106; 349/110; 349/43

[58] Field of Search ...................................... 349/141, 104, 349/106, 107, 110, 139, 140, 143, 149, 151, 152, 41, 42, 43; 438/30; 257/59

[56] References Cited

U.S. PATENT DOCUMENTS

| | | | |
|---|---|---|---|
| 5,093,738 | 3/1992 | Watanabe et al. | 359/68 |
| 5,757,455 | 5/1998 | Sugiyama et al. | 349/129 |
| 5,783,338 | 7/1998 | Cho | 430/7 |
| 5,854,663 | 12/1998 | Oh et al. | 349/42 |
| 5,933,204 | 8/1999 | Fukumoto | 349/43 |
| 5,943,107 | 8/1999 | Kadota et al. | 349/44 |
| 6,022,646 | 2/2000 | Kim et al. | 430/7 |

FOREIGN PATENT DOCUMENTS

| | | |
|---|---|---|
| 62-254122 | 11/1987 | Japan . |
| 2-54202 | 2/1990 | Japan . |
| 2-239205 | 9/1990 | Japan . |
| 3-167524 | 7/1991 | Japan . |
| 4-253028 | 9/1992 | Japan . |
| 7-72473 | 3/1995 | Japan . |

*Primary Examiner*—Matthew Smith
*Assistant Examiner*—Lex H. Malsawma
*Attorney, Agent, or Firm*—Sheridan Ross P.C.

[57] ABSTRACT

First and second substrates (1, 2) oppose each other. A display apparatus includes first and second opposing substrates. (1, 2). A common electrode (5) is formed on the side of the liquid crystal layer (3) of the second substrate (2). Display electrodes (4) of liquid crystal cells (LC) are formed on the side of the liquid crystal layer (3) of the first substrate (1). Pixel driving elements (106) are connected to the display electrodes (4). On-chip color filters (8a to 8c, 41a to 41c, 51a to 51c) of respective colors RGB, made of a photosensitive high polymer color film (31, 43, 53), are formed on the side of the liquid crystal layer (3) of the display electrodes (4). A black matrix (9, 42, 52), made of a photosensitive high polymer color film (33, 54), is formed between the on-chip color filters (8a to 8c, 41a to 41c, 51a to 51c) of the respective colors RGB.

15 Claims, 12 Drawing Sheets

Exposure

Exposure

DISPLAY AND METHOD OF PRODUCING THE DISPLAY

BACKGROUND OF THE INVENTION

The present invention relates to a display apparatus and to a method of manufacturing the same.

In recent years, a liquid crystal display (LCD) of an active matrix system using a thin film transistor (TFT) has become attractive as a high quality display apparatus.

In a dot matrix LCD for displaying by dots arranged in a matrix manner, there are a simple matrix system and the active matrix system.

The simple matrix system is a system for directly driving a liquid crystal of each pixel arranged in a matrix manner synchronously with a scan signal from the outside. A pixel portion (liquid crystal panel) is configured as a LCD display portion by only display electrodes and liquid crystal. Therefore, when the number of scanning lines increases, a driving time (duty) which is allocated to one pixel is reduced, so that contrast is deteriorated.

On the other hand, the active matrix system is a system for integrating a pixel driving element (active element) and a charge holding element (pixel capacitance) onto each pixel arranged in a matrix manner, enabling each pixel to execute memory functions, and quasi-statically driving the liquid crystal. That is, the pixel driving element functions as a switch whose turn-on and turn-off states are switched by the scan signal. A data signal (display signal) is transmitted to the display electrode through the pixel driving element in the turn-on state, thereby driving the crystal liquid. After that, when the pixel driving element is turned off, the data signal voltage supplied to the display electrode is held in a state of charges into the charge holding element and the driving of the liquid crystal is continuously executed until the pixel driving element is turned on again. Consequently, even when the number of scanning lines increases and the driving time allocated to one pixel is decreased, the driving of the liquid crystal is not influenced and the contrast is not deteriorated. According to the active matrix system, therefore, a display having a picture quality that is much higher than that of the simple matrix system is realized.

The active matrix system is mainly classified into a transistor type (3-terminal type) and a diode type (2-terminal type) depending on a difference of the pixel driving elements. The transistor type has characteristics such that, as compared with the diode type, it is difficult to manufacture but it is easy to raise the contrast or resolution, so that the LCD having a high quality that is equivalent to that of a CRT can be realized. The foregoing explanation of the operating principle of the active matrix system mainly corresponds to that of the transistor type.

As a pixel driving element of the transistor type, the TFT is generally used. In the TFT, a semiconductor thin film formed on an insulating substrate is used as an active layer. As an active layer, an amorphous silicon film and a polysilicon film are generally used, although research in which cadmium selenide (CdSe), tellurium (Te), or the like is used has been made. The TFT in which the amorphous silicon film is used as an active layer is called an amorphous silicon TFT. The TFT using the polysilicon film is called a polysilicon TFT. The polysilicon TFT has advantages such that the mobility is larger and the driving ability is higher than those of the amorphous silicon TFT. Accordingly, the polysilicon TFT can be used as not only the pixel driving element but also an element for constructing a logic circuit. Therefore, when the polysilicon TFT is used, not only the pixel portion but also a peripheral driving circuit portion arranged around it can be integrally formed on the same substrate. That is, the polysilicon TFT serving as a pixel driving element arranged on the pixel portion and the polysilicon TFT constructing the peripheral driving circuit portion are formed by the same process.

In order to display a color image in the LCD, it is necessary to provide color filters of red, green, and blue (RGB) serving as three primary colors of light.

For example, in a color LCD for a liquid crystal projector or a color LCD for direct viewing of a single plate type using one pixel portion (liquid crystal panel), the color filters of respective colors are provided so that the respective colors of RGB correspond to pixels in a one-to-one corresponding manner.

In this instance, when the color filters of respective colors of RGB are provided in one pixel portion, it is necessary to provide a black matrix made of a light shielding film between the color filters of the respective colors.

A conventional color filter is formed on a second substrate arranged in such a manner that the substrate faces a first substrate on which the pixel driving elements have been formed so as to sandwich a liquid crystal layer. When such a structure is applied, however, it is difficult to eliminate a relative positional deviation between the first and second substrates. Therefore, it is necessary to increase the width of the black matrix by only an amount corresponding to a precision of an alignment of the first and second substrates. Consequently, the area of color filter is reduced and the area of display electrode which can be used for displaying is also decreased.

A ratio of the area of display electrode which can be used for displaying the whole area of pixel portion is called an aperture ratio. As the aperture ratio rises, a lightness of the LCD is also improved, so that a high picture quality display can be realized.

That is, in the color filter with the above-mentioned structure, there is a drawback such that it is difficult to obtain the high picture quality because the aperture ratio is low.

When there is no black matrix in color boundaries of the color filters, in a portion near the boundary between the pixels (portion which does not contribute to the display), light which passes through one pixel (for example, blue pixel) intersects the pixel boundary which doesn't contribute to the display and enters an adjacent pixel of a different color (for example, red pixel), so that an unnecessary mixed color easily occurs. The color picture quality is decreased due to the unnecessary mixed color. Therefore, by providing the black matrix within a range of the portion which doesn't contribute to the display near the boundaries between the pixels, a color separation is performed, so that an improvement in color picture quality is realized. However, when the black matrix is set to a excessively wide width so as to overlap with a display electrode position (portion which contributes to the display), the aperture ratio is decreased as mentioned above.

Accordingly, a structure in which the color filters are formed on the side of the substrate on which the pixel driving elements are formed has been proposed. The color filter with this structure is called an on-chip color filter. When the on-chip color filter is applied, the drawback caused by the foregoing alignment of the substrates can be avoided.

The on-chip color filter has been disclosed in the following Official Gazettes.

(a) Official Gazette of Japanese Patent Application Laid-Open No. 62-254122 (1987) (G02F 1/133 327, G02B 5/20 101, G02F 1/133 306, G09F 9/30): in this Official Gazette, the color filter is formed by a dyeing method, a printing method, and an electrodepositing method.

(b) Official Gazette of Japanese Patent Application Laid-Open No. 4-253028 (1992) (G02F 1/1335 505, G02F 1/133 550, G02F 1/1333 505, G09F 9/00): in this Official Gazette, as a forming method of the color filter, a method of dyeing a resin insulating film formed by a spin coating method and a method of patterning insulating resin in which pigment or dye has previously been dispersed are disclosed.

(c) Official Gazette of Japanese Patent application Laid-Open No. 7-72473 (1995) (G02F 1/1335 505, G02F 1/1343, G02F 1/136 500, G02F 1/136 510): in the Official Gazette, a color filter is formed by a electrodepositing process.

In recent years, in order to reduce costs in manufacturing the LCD, the on-chip color filter which can be simply and easily produced has been requested.

It is an object of the present invention to provide a display apparatus having on-chip color filters which can be simply and easily manufactured. Another object of the present invention is to provide a method of simply and easily manufacturing a display apparatus having on-chip color filters.

SUMMARY OF THE INVENTION

According to a first aspect of the invention, a display apparatus has on-chip color filters made of a photosensitive high polymer color film.

According to the first aspect of the invention, therefore, in the display apparatus, after the photosensitive high polymer color film is adhered, an exposing process and a developing process are executed, so that the on-chip color filters can be simply and easily manufactured.

According to a second aspect of the invention, a display apparatus includes: first and second substrates which face each other; a liquid crystal layer arranged between the substrates; a common electrode formed on the side of the liquid crystal layer of the second substrate; display electrodes of liquid crystal cells formed on the side of the liquid crystal layer of the first substrate; pixel driving elements connected to the display electrodes; and on-chip color filters which are formed on the side of the liquid crystal layer of the display electrodes and which are made of a photosensitive high polymer color film.

According to the second aspect of the invention, therefore, a color liquid crystal display apparatus of an active matrix system having the on-chip color filters can be obtained. After the photosensitive high polymer color film is adhered, an exposing process and a developing process are executed, so that the on-chip color filters can be simply and easily manufactured.

DETAILED DESCRIPTION OF THE INVENTION

First Embodiment

The first embodiment of the invention will now be described hereinbelow with reference to the drawings.

Figure 1:
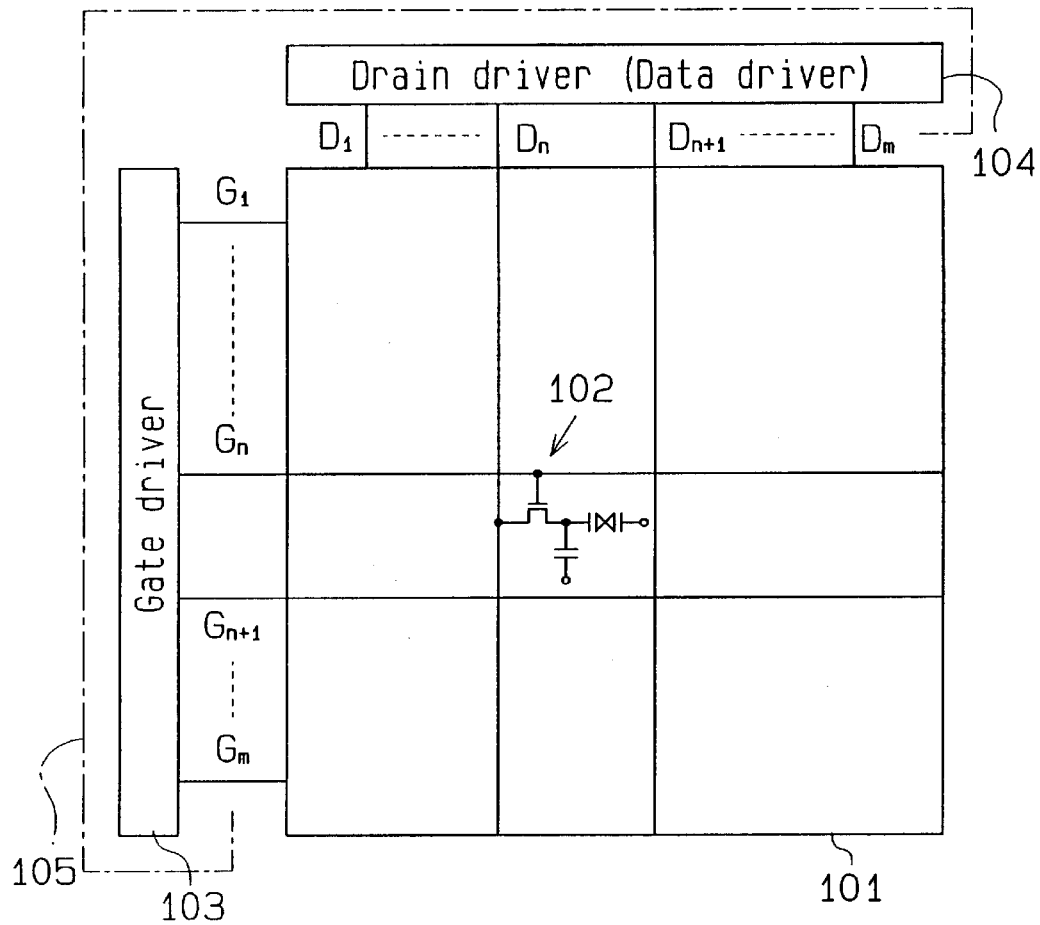
FIG. 1 is a block circuit diagram of a display apparatus of the first to third embodiments in which the present invention is embodied.

FIG. 1 shows a block diagram of an LCD of an active matrix system according to the embodiment.

Scanning lines (gate wirings) G1 . . . Gn, Gn+1 . . . Gm and data lines (drain wirings) D1 . . . Dn, Dn+1 . . . Dm are arranged in a pixel portion (liquid crystal panel) 101. The gate wirings and drain wirings perpendicularly intersect. A pixel 102 is arranged in each perpendicularly cross portion. Each of the gate wirings is connected to a gate driver 103 and receives a gate signal (scan signal). Each of the drain wirings is connected to a drain driver (data driver) 104 and receives a data signal (video signal). A peripheral driving circuit portion 105 is constructed by the drivers 103 and 104.

The LCD in which at least either of the drivers 103 and 104 is formed on the same substrate on which the pixel portion 101 is also formed is generally referred to as a driver integrated type (driver built-in type) LCD. There is also a case where the gate driver 103 is provided on both sides of the pixel portion 101. There is also a case where the drain driver 104 is provided on both sides of the pixel portion 101.

Figure 2:
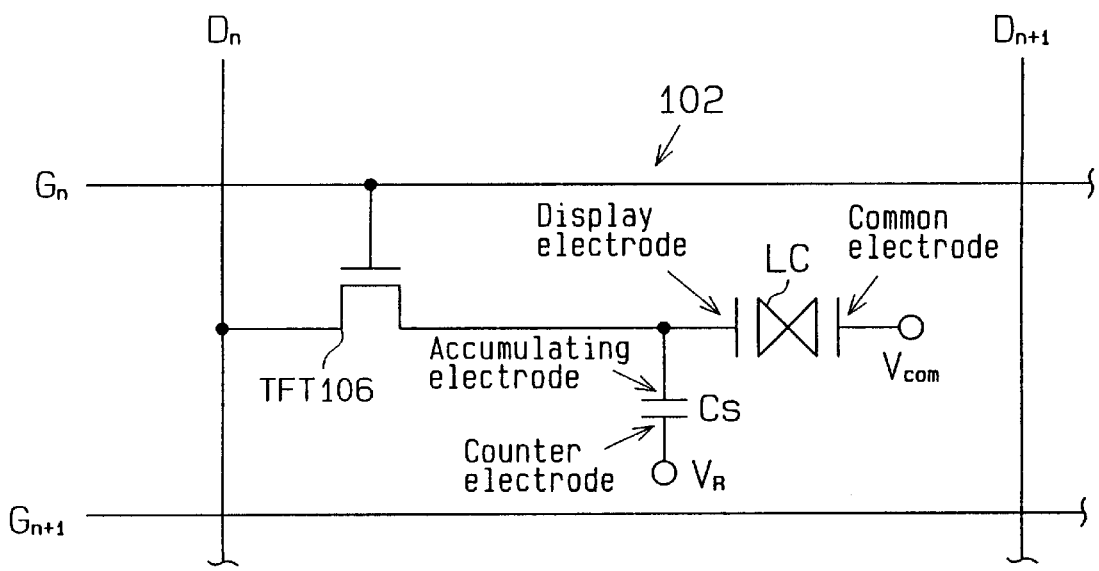
FIG. 2 is a circuit diagram of a main portion of the display apparatus of the first to third embodiments.

FIG. 2 shows an equivalent circuit of the pixel 102 provided on the perpendicular cross portion of the gate wiring Gn and drain wiring Dn.

The pixel 102 is constructed with a TFT 106 as a pixel driving element, a liquid crystal cell LC, and an storage capacitance (accumulating capacitance or additional capacitance) CS. A gate of the TFT 106 is connected to the gate wiring Gn and a drain of the TFT 106 is connected to the drain wiring Dn. A display electrode (pixel electrode) of the liquid crystal cell LC and the storage capacitance CS are connected to a source of the TFT 106. A signal holding element which has been described in the background art is constructed by the liquid crystal cell LC and storage capacitance CS. A voltage Vcom is applied to a common electrode (electrode on the side opposite to the display electrode) of the liquid crystal cell. On the other hand, in the auxiliary capacitance CS, a constant voltage VR is applied to an electrode (hereinbelow, referred to as a storage electrode) on the side opposite to the electrode (hereinbelow, referred to as an accumulating electrode) on the side to which the source of the TFT 106 is connected. The common electrode of the liquid crystal cell is literally an electrode which is common to all of the pixels 102. An electrostatic capacitance is formed between the display electrode and common electrode of the liquid crystal cell LC. There is also a case where the counter electrode of the storage capacitance CS is connected to the adjacent gate wiring Gn+1.

In the pixel 102 constructed as mentioned above, when the gate wiring Gn is set to a high voltage and the high voltage is applied to the gate of the TFT 106, the TFT 106 is turned on. The electrostatic capacitance and storage capacitance CS of the liquid crystal cell LC are charged by a data signal applied to the drain wiring Dn. On the contrary, when the gate wiring Gn is set to a low voltage and the low voltage is applied to the gate of the TFT 106, the TFT 106 is turned off and the voltage applied to the drain wiring Dn at that time is held by the electrostatic capacitance and storage capacitance CS of the liquid crystal cell LC. As mentioned above, the data signal which is desired to be written to the pixel 102 is supplied to the drain wiring and the voltage of the gate wiring is controlled, thereby enabling an desired data signal to be held in the pixel 102. A transmittance of the liquid crystal cell LC is changed in accordance with the data signal held in the pixel 102, so that an image is displayed.

Figure 3:
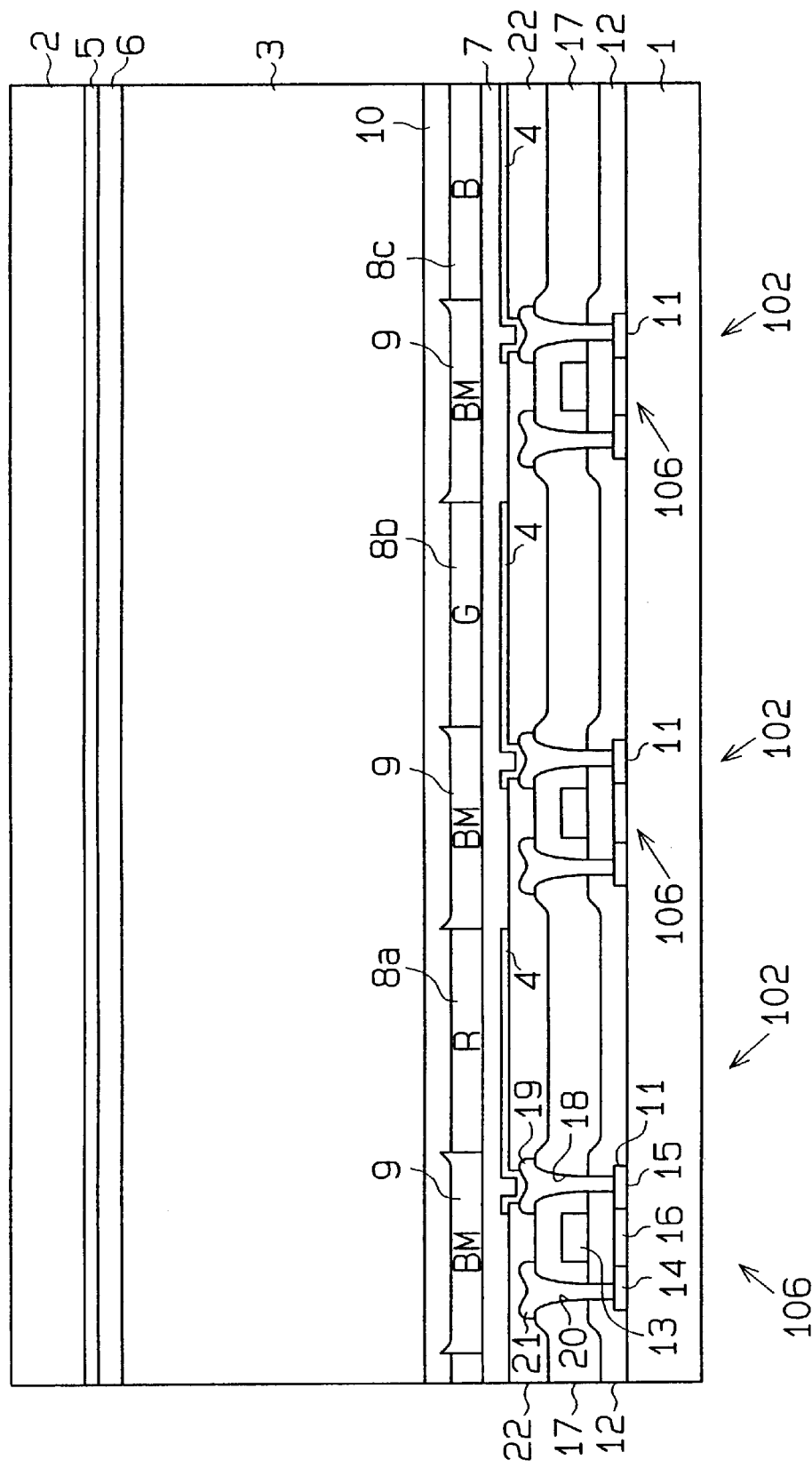
FIG. 3 is a partial schematic cross sectional view of the display apparatus of the first embodiment.
Figure 4:
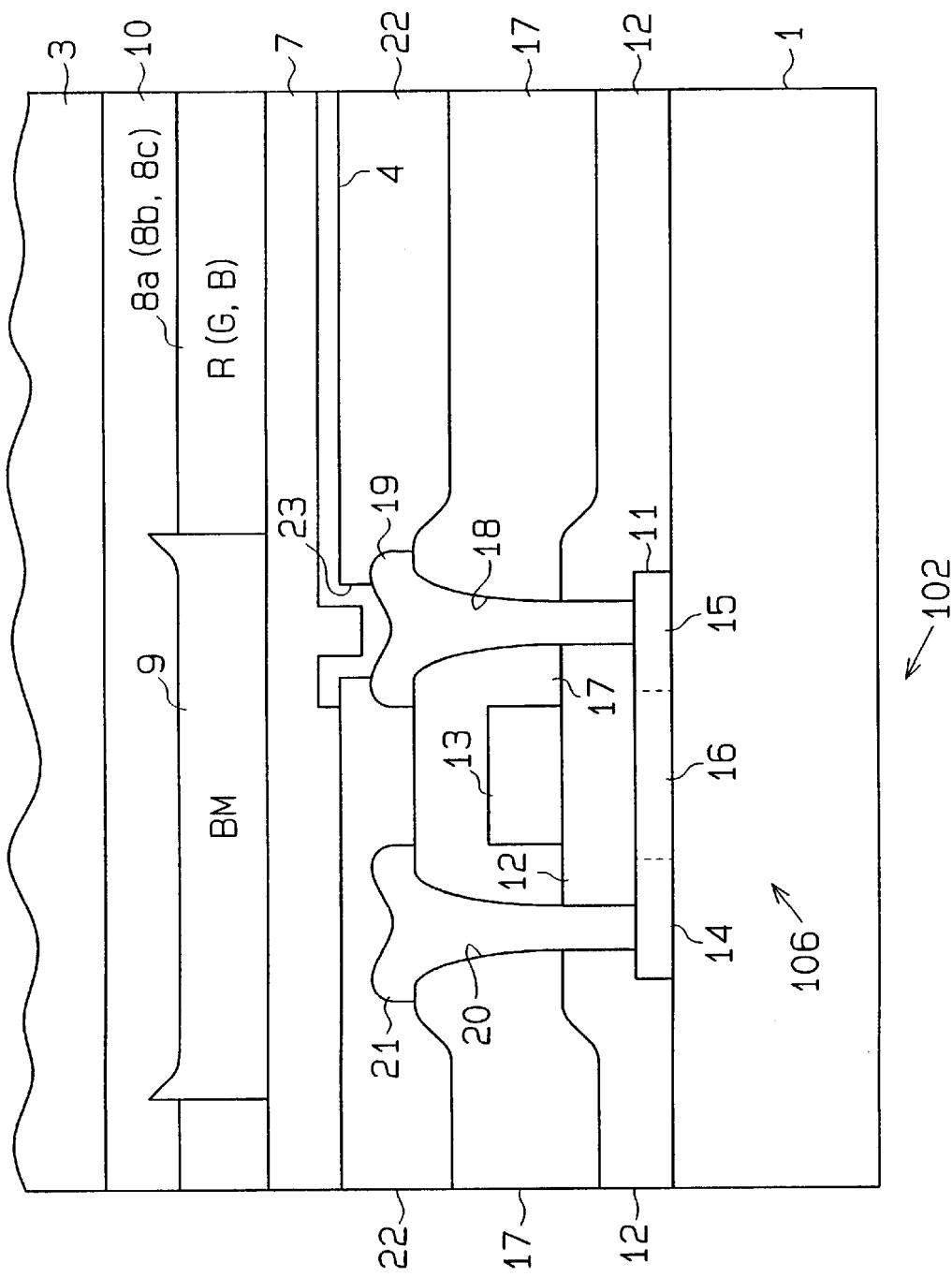
FIG. 4 is a partial enlarged diagram of FIG. 3.

FIG. 3 shows a partial schematic cross section of the pixel portion in the LCD having the on-chip color filters according to the embodiment. The LCD in the embodiment has a transmitting type construction in which a planar type polysilicon TFT with an SD (Single Drain) structure is used as a TFT 106 and is used as a color LCD for a liquid crystal projector of a single plate type or a color LCD for direct viewing. FIG. 4 shows an enlarged diagram of a portion near the TFT 106 in FIG. 3. In FIGS. 3 and 4, the auxiliary capacitance CS is omitted.

A liquid crystal layer 3 in which liquid crystal has been filled is formed between transparent insulating substrates 1 and 2 which face each other. Display electrodes 4 of the liquid crystal cell LC are formed on the transparent insulating substrate 1. A common electrode 5 of the liquid crystal cell LC is provided on the transparent insulating substrate 2. As a material for the electrodes 4 and 5, indium tin oxide (ITO) is generally used. An orientation film 6 is formed on the common electrode 5. A passivation film 7, any one of color filters 8a to 8c of RGB, and an orientation film 10 are formed on the display electrode 4 in accordance with this order. That is, the liquid crystal layer 3 is sandwiched between the orientation films 6 and 10. A black matrix 9 made of a light shielding film is formed between the color filters 8a to 8c of respective colors RGB. The film thickness of the black matrix 9 is equal to that of each of the color filters 8a to 8c.

Polysilicon films 11 each constructing the active layer of the TFT 106 are formed on the surface of the transparent insulating substrate 1 on the side of the liquid crystal layer 3. A gate insulating film 12 is formed on the polysilicon films 11. Gate electrodes 13 constructing the gate wirings Gn are formed on the gate insulating film 12. A drain region 14 and a source region 15 are formed in each of the polysilicon films 11 and a channel region 16 is formed between the regions 14 and 15. The TFT 106 is constructed by the regions 14 to 16 and gate electrode 13.

An interlayer insulating film 17 is formed on the whole surfaces of the TFTs 106. Each of the source regions 15 is connected to a source electrode 19 via a contact hole 18 formed in the interlayer insulating film 17. Each of the drain regions 14 is connected to a drain electrode 21 constructing the drain wiring Dn via a contact hole 20 formed in the interlayer insulating film 17. A planarizing insulation film 22 is formed on the whole surfaces of the electrodes 19 and 21 and interlayer insulating film 17. Each of the source electrodes 19 is connected to each of the display electrodes 4 via a contact hole 23 formed in the planarizing insulation film 22.

As mentioned above, the reason the source region 15 and display electrode 4 are connected through the source electrode 19 is to obtain a fine ohmic contact between the source region 15 and display electrode 4. That is, if the source electrode 19 is omitted, the source region 15 made of the polysilicon film 11 is directly connected to the display electrode 4 made of ITO. Consequently, an energy gap due to a band gap difference occurs by a junction of the source region 15 and display electrode 4, so that a fine ohmic contact cannot be obtained. When the ohmic contact between the source region 15 and display electrode 4 is not provided, the data signal supplied to the drain wiring Dn is not accurately written to the pixel 102, so that the picture quality of the LCD is decreased. By providing the source electrode 19 made of an aluminum alloy film, the fine ohmic contact can be obtained as compared with the case where the source region 15 and display electrode 4 are directly connected.

There is also a case where in the TFT 106, the source region 15 and source electrode 19 are referred to as a drain region and a drain electrode, respectively, and the drain region 14 and drain electrode 21 are referred to as a source region and a source electrode, respectively. In this case, the drain wiring Dn is referred to as a source wiring and the drain driver 104 is referred to as a source driver.

A manufacturing method of the embodiment will now be sequentially explained.

Process 1: first, the non-doped polysilicon film 11 (film thickness: about 500 Å) is formed on the transparent insulating substrate 1 (quartz glass, high heat resisting glass).

As a forming method of the polysilicon film 11, there are the following methods.

(1) A method of directly forming the polysilicon film 11: a CVD (Chemical Vapor Deposition) method or a PVD (Physical Vapor Deposition) method is used. As a CVD method, there are an atmospheric pressure CVD method, an low pressure CVD method, a plasma CVD method, an ECR (Electron Cyclotron Resonance) plasma CVD method, a photo-excited CVD method, and the like. As a PVD method, there are an evaporation depositing method, an EB (Electron Beam) depositing method, an MBE (Molecular Beam Epitaxy) method, a sputtering method, and the like.

Among them, the low pressure CVD method using a thermal decomposition of monosilane ($SiH_4$) or disilane ($Si_2H_6$) is generally used and can form the polysilicon film 11 of the highest quality. In the low pressure CVD method, when a processing temperature is equal to or lower than about 550° C., amorphous silicon is obtained and, when the processing temperature is equal to or higher than about 620° C., polysilicon is obtained.

The plasma CVD method using a thermal decomposition of monosilane or disilane in plasma is also used. A processing temperature of the plasma CVD method is about 300° C. When hydrogen is added, the reaction is promoted, so that an amorphous silicon film is formed. When an inactive gas (helium, neon, argon, krypton, xenon or radon) is added, plasma is excited, so that a polysilicon film is formed at the same processing temperature.

(2) A method of forming an amorphous silicon film and, after that, polycrystallizing the film, thereby forming the polysilicon film 6: a solid phase growing method or a melting recrystallizing method is used.

The solid phase growing method is a method of executing a heat treatment to the amorphous silicon film at about 600° C. for a long time of about 20 hours and polycrystallizing the film which is solid as it is, thereby obtaining the polysilicon film.

The melting recrystallizing method is a method of keeping a temperature of the substrate to be equal to or lower than 600° C. while realizing a recrystal by melting only the surface of the amorphous silicon film. As such a method, there are a laser annealing method or an RTA (Rapid Thermal Annealing) method. The laser annealing method is a method of heating and melting the surface of the amorphous silicon film by irradiating a laser beam. The RTA method is a method of heating and melting the surface of the amorphous silicon film by irradiating a lamp light.

As mentioned above, when the substrate temperature is set so as not to be equal to or higher than 600° C. by using the solid phase growing method or melting recrystallizing method, high heat resisting glass can be used as a transparent insulating substrate. Since quartz glass becomes remarkably expensive in association with an increase in size and the increase in size is limited at present, the dimensions of the substrate are restricted. Therefore, a panel size of a low cost LCD is 2 inches or smaller, so that the LCD of the size can be sufficiently used as that for a view finder or a liquid crystal projector of a video camera but it cannot be used for direct viewing because the panel size is too small. On the other hand, as for normal glass (high heat resisting glass), the price is about 1/10 of that of quartz glass and the size is not restricted. High heat resisting glass which is commercially available for the LCD at present (for example, "7059", a trade name, manufactured by U.S. Corning Inc.) has a resisting temperature of about 600° C. Therefore, in order to use the normal glass (high heat resisting glass) as the transparent insulating substrate, it is required that a polysilicon TFT is formed using a process at a low temperature of about 600° C. or lower (referred to as a low temperature process). In case of forming the polysilicon TFT by a process at a high temperature of about 1000° C., the process is referred to as a high temperature process in contrast to the low temperature process.

Subsequently, the gate insulating film 12 (film thickness: about 1000 Å) is formed on the polysilicon film 11.

As for the forming method of the gate insulating film 12, there are the following methods.

[1] Method of forming a silicon oxide film by using an oxidizing method: a high temperature oxidizing method (a dry oxidizing method using dry oxygen, a wet oxidizing method using wet oxygen, and an oxidizing method in the steam atmosphere), a low temperature oxidizing method (an oxidizing method in the high pressure steam atmosphere, and an oxidizing method in oxygen plasma), an anodic oxidizing method, or the like is used.

[2] Method of forming a silicon oxide film, a silicon nitride film, a silicon nitride oxide film (SiOxNy) by using an adhering method: the CVD method or PVD method is used. There is also a method of combining the films, thereby forming a multi-layer structure.

In order to form the silicon oxide film by the CVD method, the thermal decomposition of monosilane or disilane, thermal decomposition of organic oxysilane such as TEOS (Tetra-Ethyl-Ortho-Silicate), hydrolysis of silicon halide, or the like is used. In order to form the silicon nitride film by the CVD method, the thermal decomposition of ammonia and dichlorosilane ($SiH_2C_{12}$), ammonia and monosilane, nitrogen and monosilane, or the like is used. The silicon nitride oxide film has characteristics of both of the oxide film and nitride film and can be formed by doping a little amount of nitrogen oxide ($N_2O$) to a system for forming the silicon nitride film by the CVD method.

As for the forming method of the gate insulating film 12 as well, there are the high temperature process and low temperature process. As a high temperature process, the foregoing high temperature oxidizing method is generally used. On the other hand, as a low temperature process, the above-mentioned oxidizing method or adhering method in oxygen plasma is generally used and the processing temperature is limited to about 600° C. or lower.

Subsequently, the gate electrode 13 (film thickness: about 3000 Å) is formed on the gate insulating film 12 and is patterned into a desired form. As a material for the gate electrode 13, polysilicon to which impurities have been doped (doped polysilicon), metal silicide, polycide, sole metal of a high melting point, the other metal, or the like is used. For the formation, the CVD method or PVD method is used.

Subsequently, the drain region 14 and source region 15 is formed in the polysilicon film 11 by using the gate electrode 13 as a mask by a self aligning technique. As a method of forming the regions 14 and 15, there are also the high temperature process and low temperature process. In the high temperature process, after the ions of impurities are implanted, a heat treatment is executed at a high temperature, thereby activating the impurities. In the low temperature process, by irradiating an ion shower by mixture gas of phosphine gas ($PH_3$) or diborane gas ($B_2H_6$) and hydrogen gas, the implantation and activation of impurities are simultaneously executed without performing a special heat treating process. In the low temperature process, there is also a method whereby after completion of the implantation of impurity ions, the heat treatment for several to tens hours at about 600° C. or less is executed, thereby activating the impurities.

Subsequently, the interlayer insulating film 17 (film thickness: about 2000 to 4000 Å) is formed on the whole surface of the device. As an interlayer insulating film 17, a silicon oxide film, a silicon nitride film, a silicon nitride oxide film, silicate glass, or the like is used. As for the formation of it, the CVD method or PVD method is used. There is also a method of combining the films, thereby forming a multi-layer structure. For example, there is a method whereby the interlayer insulating film 17 is constructed by a structure (NSG/BPSG/NSG) in which a BPSG (Boron-doped Phospho-Silicate Glass) film is sandwiched by a non-doped silicon oxide film (hereinbelow, referred to as an NSG film), the BPSG film is formed, and after that, a reflow is performed, thereby improving a jaggy or a step coverage property of the interlayer insulating film 17.

Subsequently, the contact holes 18 and 20 are formed in the interlayer insulating film 17 by anisotropic etching.

A hydrogenating process on the polysilicon film 11 is performed by exposing the device in hydrogen plasma. The hydrogenating process is a method whereby hydrogen atoms terminate dangling bond of to a crystal defective portion in polysilicon, thereby reducing the number of defects, stabilizing a crystal structure, and raising a field effect mobility. Consequently, element characteristics of the TFT 106 are improved.

By the sputtering method, an aluminum alloy film (Al-1%Si-0.5%Cu) (film thickness: about 5000 to 10000 Å) is deposited onto the whole surface of the device including portions in the contact holes 18 and 20. By patterning the aluminum alloy film into a desired form, the source electrode 19 and drain electrode 21 are formed.

The reason the aluminum alloy film is made to contain supersaturated silicon of 1% is that it prevents silicon moving from the polysilicon film 11 to the electrodes 19 and 21. The reason copper is added to the aluminum alloy film is to improve an electromigration resistance and a stress migration resistance of the electrodes 19 and 21.

Subsequently, the planarizing insulation film 22 (film thickness: about 1.0 to 2.0 μm) is formed on the whole surface of the device. As a planarizing insulation film 22, the silicon oxide film, silicon nitride film, silicon nitride oxide film, silicate glass film, or the like is used. The CVD method or PVD method is used for the formation. An SOG (Spin On Glass) film, a synthetic resin film (a polyimide resin film, an organic silica film, an acrylic resin film, or the like) is also used. Further, there is also a method of combining the films, thereby forming a multi-layer structure.

The contact hole 23 is formed in the planarizing insulation film 22 by the anisotropic etching. Subsequently, an ITO film is deposited onto the whole surface of the device including a portion in the contact hole 23 by the sputtering method. The display electrode 4 (film thickness: about 1000 to 2000 Å) is formed by patterning the ITO film into a desired form.

The passivation film 7 is formed on the whole surface of the device. As a passivation film 7, the silicon nitride film, PSG (Phospho-Silicate Glass) film, or the like is used. The CVD method or PVD method is used for the formation.

Figure 5A:
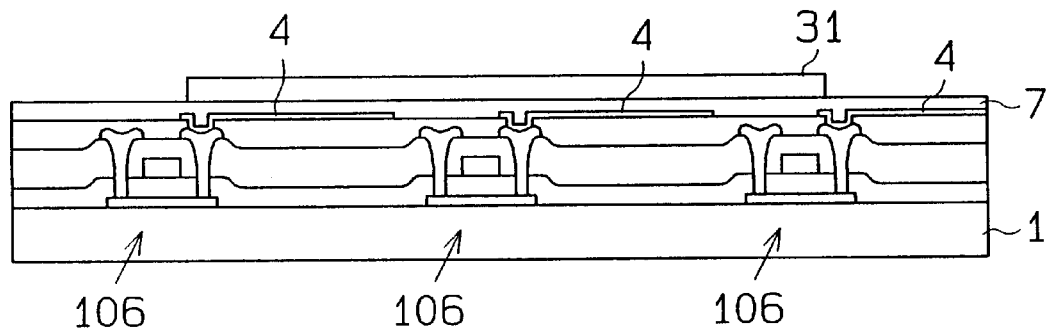
FIG. 5(a) to FIG. 5(c) are partial schematic cross sectional views for explaining a method of manufacturing the display apparatus of the first embodiment.
Figure 5B:
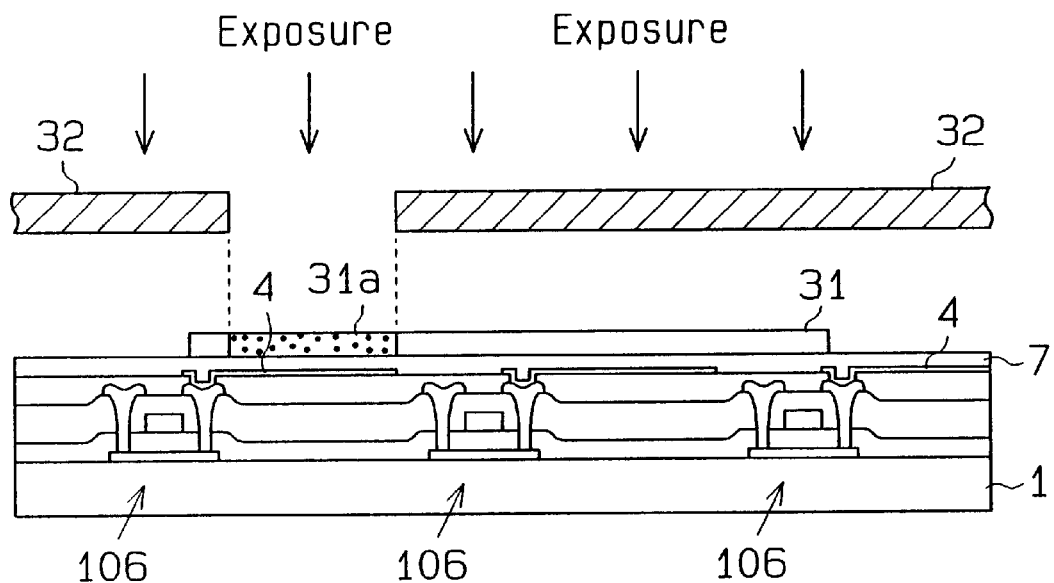
Figure 5C:
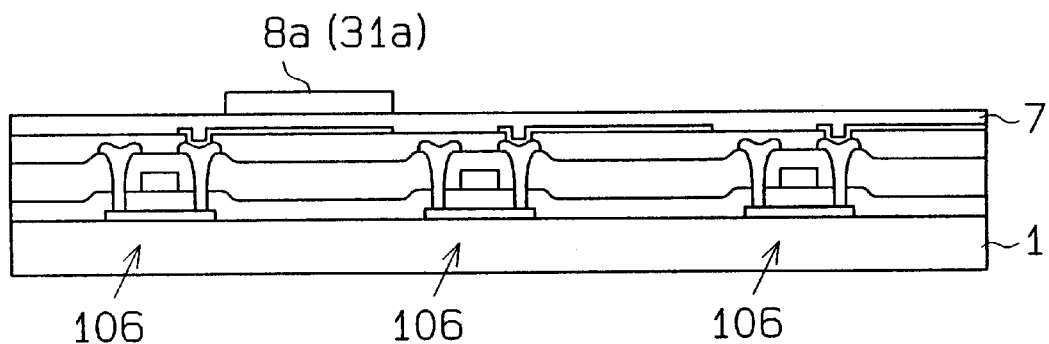

Process 2 [refer to FIG. 5(*a*)]: a red photosensitive high polymer color film (film resist) 31 (film thickness: about 2.0 μm) is adhered onto the passivation film 7. Specifically, while being heated at a proper temperature (for example, about 130 to 150° C.), the photosensitive high polymer color film 31 is adhered with pressure by a roller. By the thermal compression bonding, enough adhesive properties can be obtained without adhesive agent. As such a red photosensitive high polymer color film, there is "Transer R11", a trade name, made by Fuji Photo Film Co., Ltd. of Japan.

Process 3 [refer to FIG. 5(*b*)]: the photosensitive high polymer color film 31 is exposed through a photomask 32 having a pattern corresponding to the color filters 8*a* of R, so that each portion 31*a* of the photosensitive high polymer color film 31 corresponding to the color filter 8*a* is photosensitized. Consequently, the photosensitized portion 31*a* of the photosensitive high polymer color film 31 becomes insoluble for developing solution.

Process 4 [refer to FIG. 5(*c*)]: by performing a developing process of the photosensitive high polymer color film 31, the color filter 8*a* of R is formed from the portion 31*a*. That is, a portion except the portion 31*a* in the photosensitive high polymer color film 31 is dissolved and removed by developing solution, so that only the portion 31*a* remains. Subsequently, a baking process (processing temperature: 220° C.) is executed, thereby drying the color filter 8*a* of R.

Figure 6A:
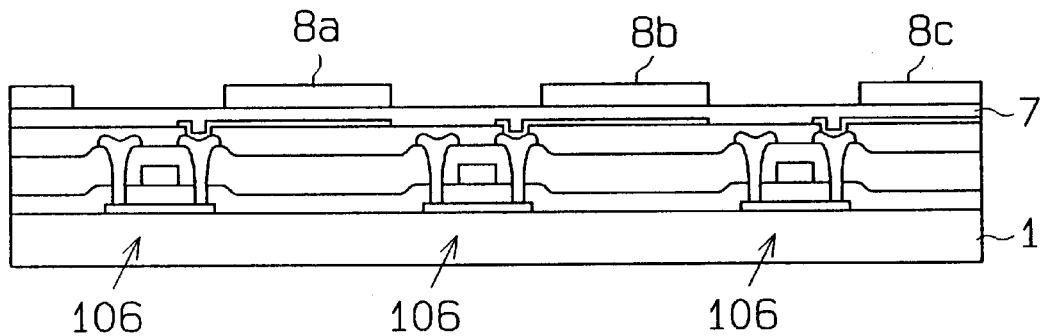
FIG. 6(a) to FIG. 6(c) are partial schematic cross sectional views for explaining the method of manufacturing the display apparatus of the first embodiment.
Figure 6B:
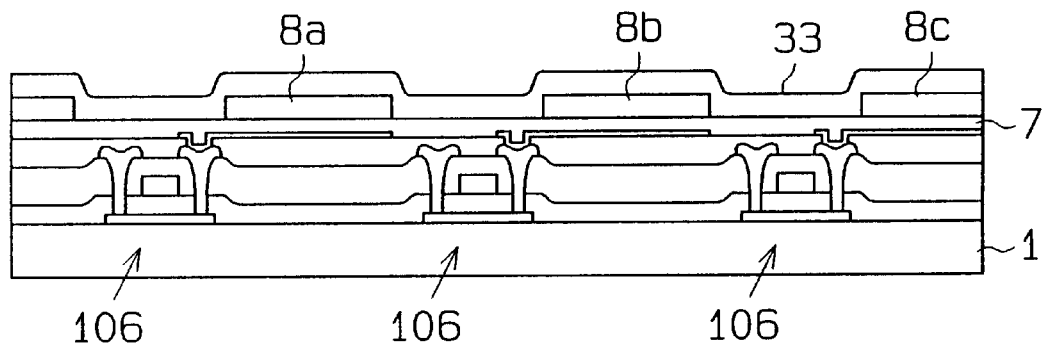
Figure 6C:
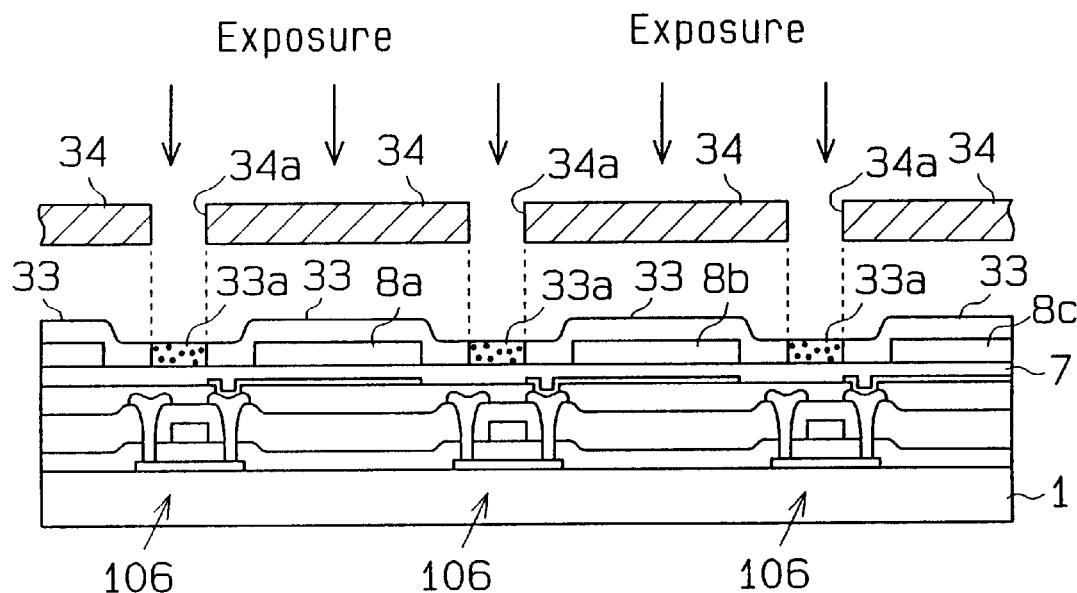

Process 5 [refer to FIG. 6(*a*)]: In a manner similar to the foregoing processes 2 to 4, the color filter 8*b* of G is formed from the green photosensitive high polymer color film and the color filter 8*c* of B is formed from the blue photosensitive high polymer color film. As such green and blue photosensitive high polymer color films, trade names "Transer G11" and "Transfer B11" manufactured by Fuji photo film Co., Ltd. exist. After completion of the developing process of the color filter 8*b* of G and color filter 8*c* of B, the baking process (processing temperature: 220° C.) is performed, thereby drying the color filters 8*b* and 8*c*, respectively.

Process 6 [refer to FIG. 6(*b*)]: A black photosensitive high polymer color film 33 (film thickness: about 2.0 μm) is adhered onto the color filters 8*a* to 8*c* of respective colors of RGB and passivation film 7. Its specific method is the same as that of the photosensitive high polymer color film 31. As such a black photosensitive high polymer color film, there is "Transer Kt1", a trade name, made by Fuji Photo Film Co., Ltd.

Process 7 [refer to FIG. 6(*c*)]: the photosensitive high polymer color film 33 is exposed through a photomask 34 having a pattern of aperture 34*a* each of which is smaller than that between the color filters 8*a* to 8*c* of respective colors of RGB and that is larger than the opaque material portion such as a gate electrode 13 or the like of the TFT 106, so that portions 33*a* of the photosensitive high polymer color film 33 corresponding to the aperture 34*a* are photosensitized. Consequently, the photosensitized portions 33*a* of the photosensitive color film 33 become insoluble for developing solution.

Figure 7A:
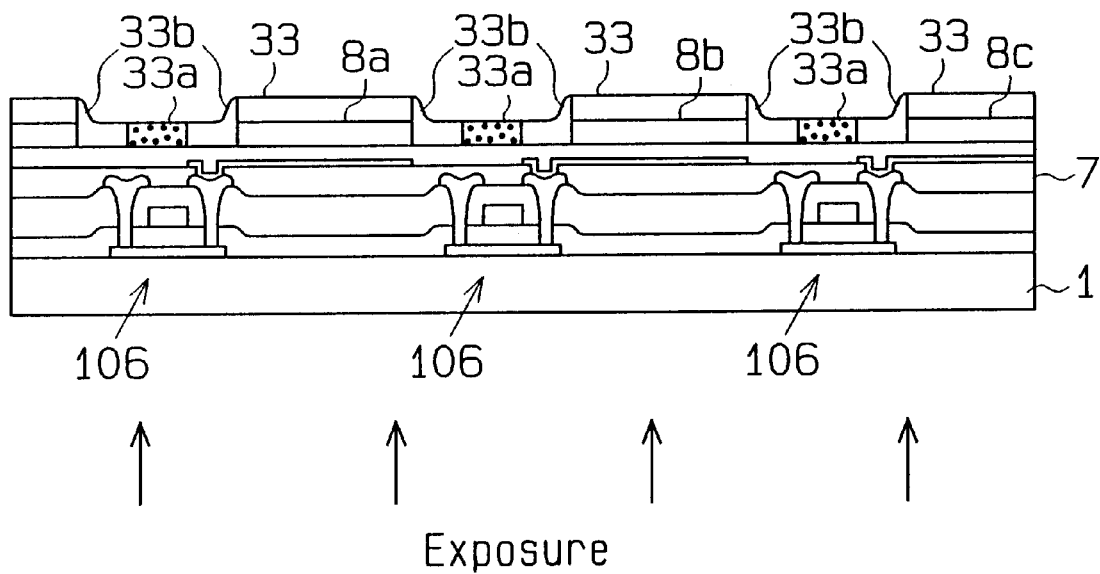
FIG. 7(a) and FIG. 7(b) are partial schematic cross sectional views for explaining the method of manufacturing the display apparatus of the first embodiment.
Figure 7B:
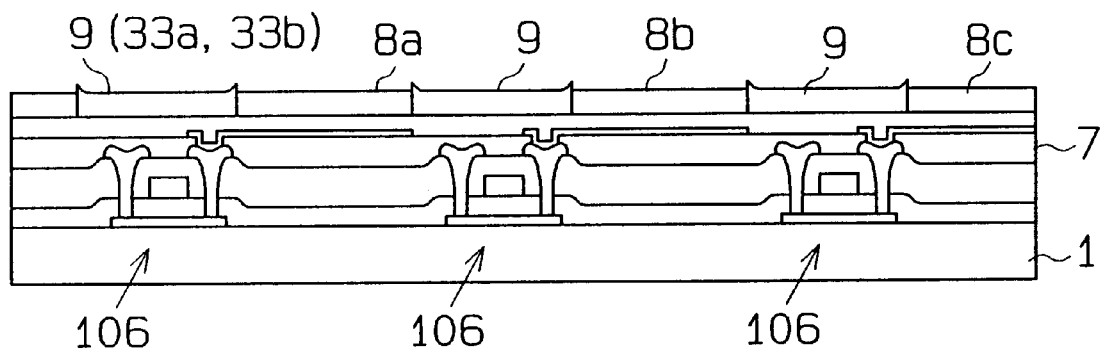

Process 8 [refer to FIG. 7(*a*)]: the surface of the transparent insulating substrate 1 on which the TFTs 106 have been formed is exposed from the rear side, so that the portions 33*b* of the photosensitive high polymer color film 33 sandwiched between the color filters 8*a* to 8*c* of respective colors of RGB and portions 33*a* of the photosensitive high polymer color film 33 are photosensitized. In this instance, since the photosensitive high polymer color film 33 adhered on the color filters 8*a* to 8*c* of respective colors of RGB is hardly exposed, only the portions 33*b* are exposed and photosensitized. Consequently, the photosensitized portions 33*b* of the photosensitive high polymer color film 33 become insoluble for developing solution.

Process 9 [refer to FIG. 7(*b*)]: the developing process is performed on the photosensitive high polymer color film 33, thereby forming the black matrix 9 comprising the foregoing portions 33*a* and 33*b*. That is, a portion except the portions 33*a* and 33*b* in the photosensitive high polymer color film 33 is dissolved by the developing solution and is removed, so that only the portions 33*a* and 33*b* remain. Subsequently, a post baking process (processing temperature: 240° C.) is executed, so that the black matrix 9 is dried and sufficiently hardened and the color filters 8*a* to 8*c* of respective colors of RGB are also hardened enough, respectively.

As mentioned above, in the process 8, by a back-face exposing method in which the color filters 8*a* to 8*c* of respective colors of RGB are used as light shielding films, the portions 33*b* matched to the gaps between the color filters 8*a* to 8*c* and portions 33*a* of the black matrix 9 are formed. In the process 7, by a front-face exposing method using the photomask 34, the portion (opaque material portion such as a gate electrode 13 or the like of the TFT 106) which cannot be exposed by the foregoing back-face exposing method is exposed, thereby forming the portions 33*a*.

The black photosensitive high polymer color film 33 is a film which is photosensitized by light that is different from that in case of the red, blue, and green photosensitive high polymer color films and is exposed by light having a specified wavelength, for example, ultraviolet rays having a wavelength of 365 nm. In this instance, the important point is a technique for enabling the back-face exposing method to be executed. Ultraviolet ray absorbent is contained in the color filters 8a to 8c which have been already formed. Therefore, only a portion, except the positions of the red, blue, and green photosensitive high polymer color films and the position of the opaque material portion of the TFT 106, is exposed by the ultraviolet rays having a wavelength of 365 nm. Since there is a limitation in ultraviolet ray absorbing effect of the red, blue, and green photosensitive high polymer color films and a limit value is set to the exposure of about 100 mJ (photo output of 10 mW for ten seconds), it is necessary to expose the black photosensitive high polymer color film 33 by ultraviolet rays of a low power of up to such a limit value.

Process 10 [refer to FIG. 3]: the orientation film 10 is formed on the color filters 8a to 8c of respective colors of RGB and the black matrix 9. In this instance, a forming temperature (about 180° C.) of the orientation film 10 is set so as to be lower than a heat resisting temperature of the color filter 8a to 8c and black matrix 9.

By the sputtering method, the ITO film is deposited onto the whole surface of the transparent insulating substrate 2, thereby forming the common electrode 5. Subsequently, the orientation film 6 is formed on the common electrode 5.

As orientation films 6 and 10, an oblique evaporation deposition film of silicon oxide (Sio), a polyimide resin film, a silane film, or the like is used.

The surfaces of the orientation films 10 and 6 of the transparent insulating substrates 1 and 2 are set so as to face each other and the liquid crystal layer 3 is formed by sealing liquid crystal between them, thereby accomplishing the pixel portion 101 of the LCD.

In case of using low heat resisting glass as a transparent insulating substrate 1, the low temperature process has to be used not only upon formation of the polysilicon film 11 but also for all of the processes up to the formation of the orientation film 10.

As a forming method of the orientation film 10 by the low temperature process, there is a method of coating a soluble solution of polyimide onto the whole surfaces of the color filters and black matrix and volatilizing the solution at a temperature of 20° C. or less, thereby obtaining the polyimide orientation film. When the above-mentioned soluble polyimide is used, since the processing temperature is lower than that of a case where polyamic acid is used as a starting substance of the orientation film, it is preferable for the LCD of the on-chip color filters to have a heat resisting temperature of 200 to 300° C. (ordinarily, about 240° C.). As a heating temperature to chemically synthesize polyimide from polyamic acid, when the synthesis can be accomplished at a temperature of, for example, 300° C. or less, so long as the on-chip color filter having a heat resisting temperature of, for example, 300° C. or more can be realized, it is possible to apply the orientation film in which polyamic acid is used as a starting substance.

As mentioned above, according to the embodiment, the following operations and effects can be obtained.

<1> The on-chip color filter can be fabricated by forming the color filters 8a to 8c onto the display electrodes 4 through the passivation film 7. Consequently, the aperture ratio of the pixel portion 101 can be improved irrespective of an accuracy in alignment of the transparent insulating substrates 1 and 2, so that a high picture quality can be obtained.

<2> The color filters 8a to 8c of respective colors RGB are formed by using the photosensitive high polymer color film 31. The black matrix 9 is formed by using the photosensitive high polymer color film 33. Each of the color films 31 and 33 can be simply and easily adhered to the coated object by adhering with a pressure while heating. Since the exposing process and developing process to the color films 31 and 33 are processes using the techniques which have been generally used in the process for manufacturing a semiconductor, the processes are simple and easy. Therefore, as compared with the methods disclosed in the foregoing Official Gazettes (a) to (c), the color filters 8a to 8c and the black matrix 9 can be simply and easily manufactured.

<3> The forming temperature of the orientation film 10 is set so as to be lower than the heat resisting temperature of the color filters 8a to 8c and black matrix 9. Therefore, when the orientation film 10 is formed, there is no fear that the forms and characteristics of the color filters 8a to 8c and black matrix 9 change.

<4> By forming the planarizing insulation film 22, the device surface (surfaces of the display electrodes 4, passivation film 7, color filters 8a to 8c, black matrix 9, and alignment film 10) is flattened. Consequently, the following operations and effects can be obtained.

<5> The surface jaggy portion of the display electrode 4 is reduced. Consequently, the film thickness of the display electrode 4 is uniform, and there is no fear of a resistance value of the display electrode 4 increases or a failure such as a disconnection or the like.

<6> Since the surface of the orientation film 10 is flattened, the alignment of liquid crystal molecules in the liquid crystal layer 3 is uniform. Consequently, even when the pixel 102 is miniaturized, an excellent alignment of the liquid crystal layer 3 can be obtained, so that a high precise pixel portion 101 can be obtained.

Second Embodiment

The second embodiment in which the invention is embodied will now be described with reference to FIG. 8. In the embodiment, the same construction members as those in the first embodiment are shown by the same reference numerals and those explanations are omitted.

Figure 8:
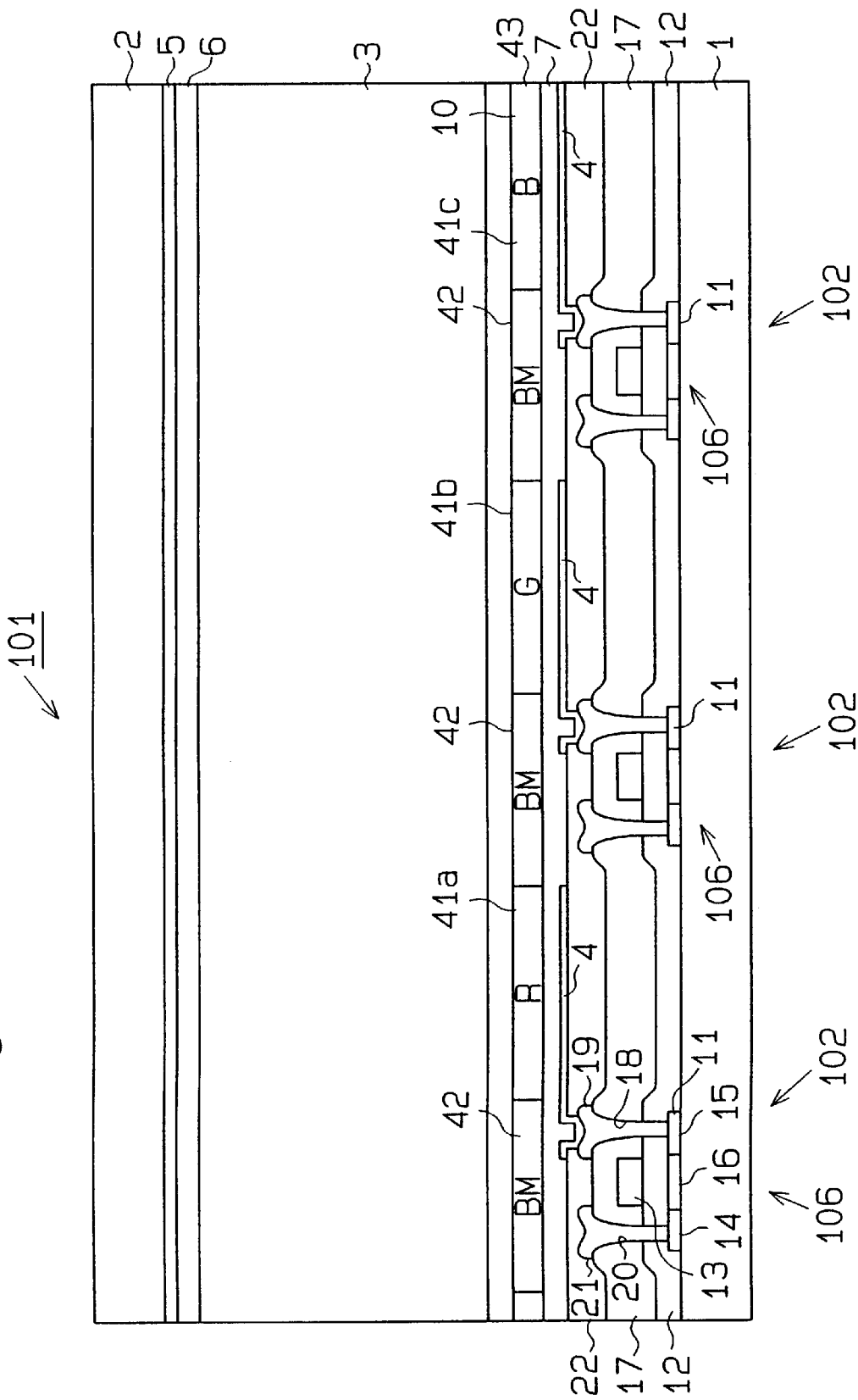
FIG. 8 is a partial schematic cross sectional view of the display apparatus of the second embodiment.

FIG. 8 shows a partial schematic cross section of the pixel portion 101 in the LCD having the on-chip color filters. The second embodiment differs from the first embodiment with respect to only the point that color filters 41a to 41c of respective colors RGB and black matrix 42 are formed by using one photosensitive high polymer color film 43. Therefore, the film thickness of a black matrix 42 is the same as that of each of the color filters 41a to 41c.

The photosensitive high polymer color film 43 is a photosensitive high polymer color film similar to a color film which is used for a still picture and is subjected to processes for exposing, color developing, and bleaching and fixing, thereby enabling a color pattern constructed by the color filters 41a to 41c of respective colors RGB and black matrix 42 to be formed.

A forming method of the color filters 41a to 41c of respective colors RGB and black matrix 42 will now be explained.

Process 1: the photosensitive high polymer color film 43 (film thickness: about 6.0 $\mu$m) is adhered onto the passivation film 7. Its specific method is the same as that of the photosensitive high polymer color film 31. When the photosensitive high polymer color film 43 itself has no thermal pressure adhesive force, an adhesive agent is coated onto the passivation film 7, so that the photosensitive high polymer color film 43 can be adhered onto the passivation film 7 due to an adhesive force of the adhesive agent. As such an adhesive agent, an organic agent such as gelatin or the like is used. As a coating method, a spinner method can be used.

The photosensitive high polymer color film 43 is constructed with photosensitive high polymer color films of three layers. The films of the respective layers are colored so as to correspond to the colors RGB, respectively. The colors of the respective layers of the photosensitive high polymer color films can be set to a combination of cyan, magenta, and yellow having a complementary color relation with the respective colors RGB. In this case, the three primary colors of RGB can be reconstructed by an overlap combination of the complementary colors.

Process 2: first, the photosensitive high polymer color film 43 is exposed through a photomask which can be coped with three colors of RGB and black by one and the developing process is executed to the film, so that the color filters 41a to 41c of respective colors of RGB and black matrix 42 are simultaneously formed.

As mentioned above, according to the embodiment, in addition to the operation and effects similar to those in <1>, and <3> to <6> of the first embodiment, the following operations and effects can be obtained.

<1> The color filters 41a to 41c of the respective colors RGB and black matrix 42 can be formed simpler and easier than those in the first embodiment.

<2> Since the exposing process is completed only once, a positional deviation of the color filters 41a to 41c of the respective colors RGB can be prevented.

Third Embodiment

The third embodiment of the invention will now be explained with reference to the drawings. In the embodiment, the same members as those in the first embodiment are shown by the same reference numerals and those descriptions are omitted.

Figure 9:
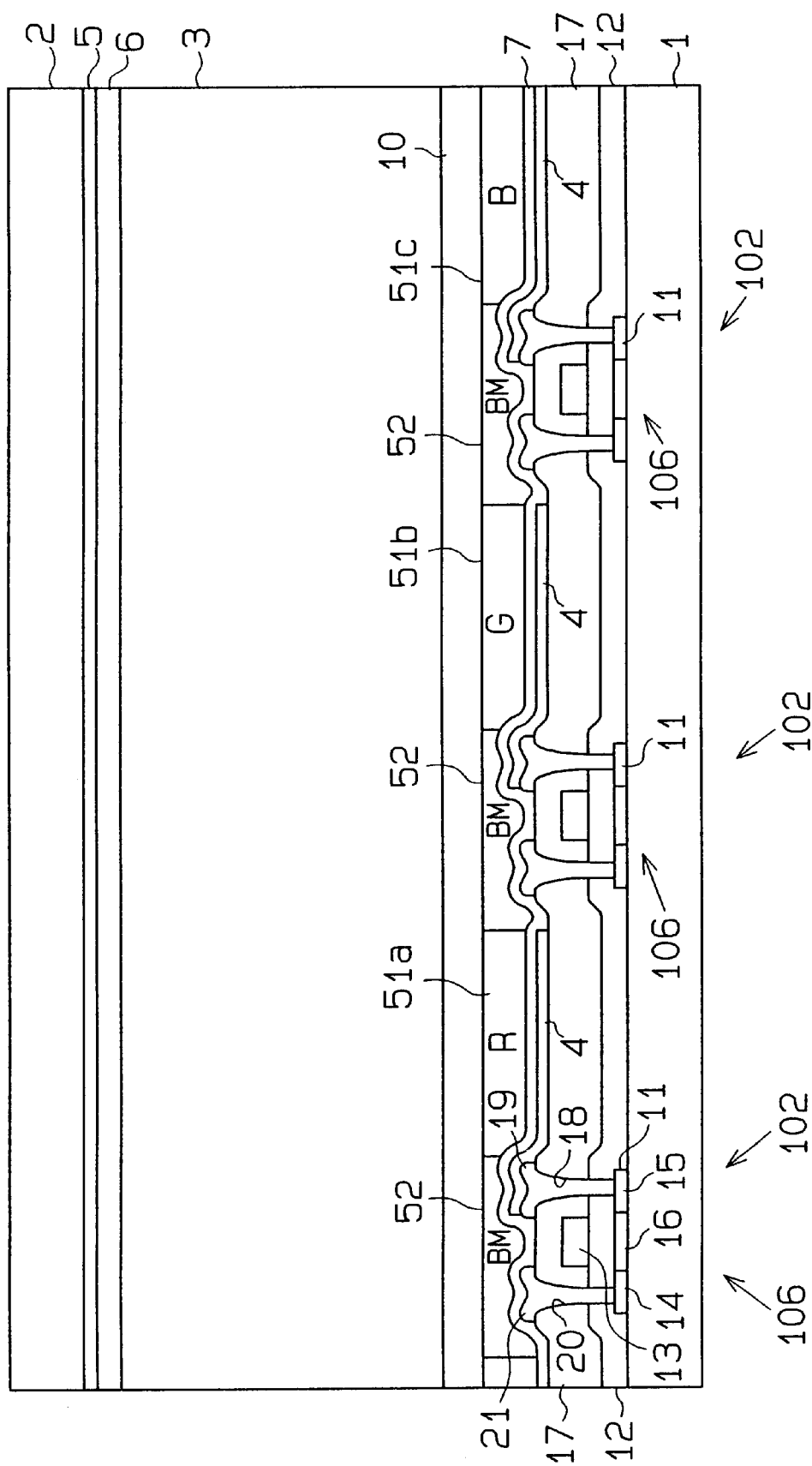
FIG. 9 is a partial schematic cross sectional view of the display apparatus of the third embodiment.
Figure 10:
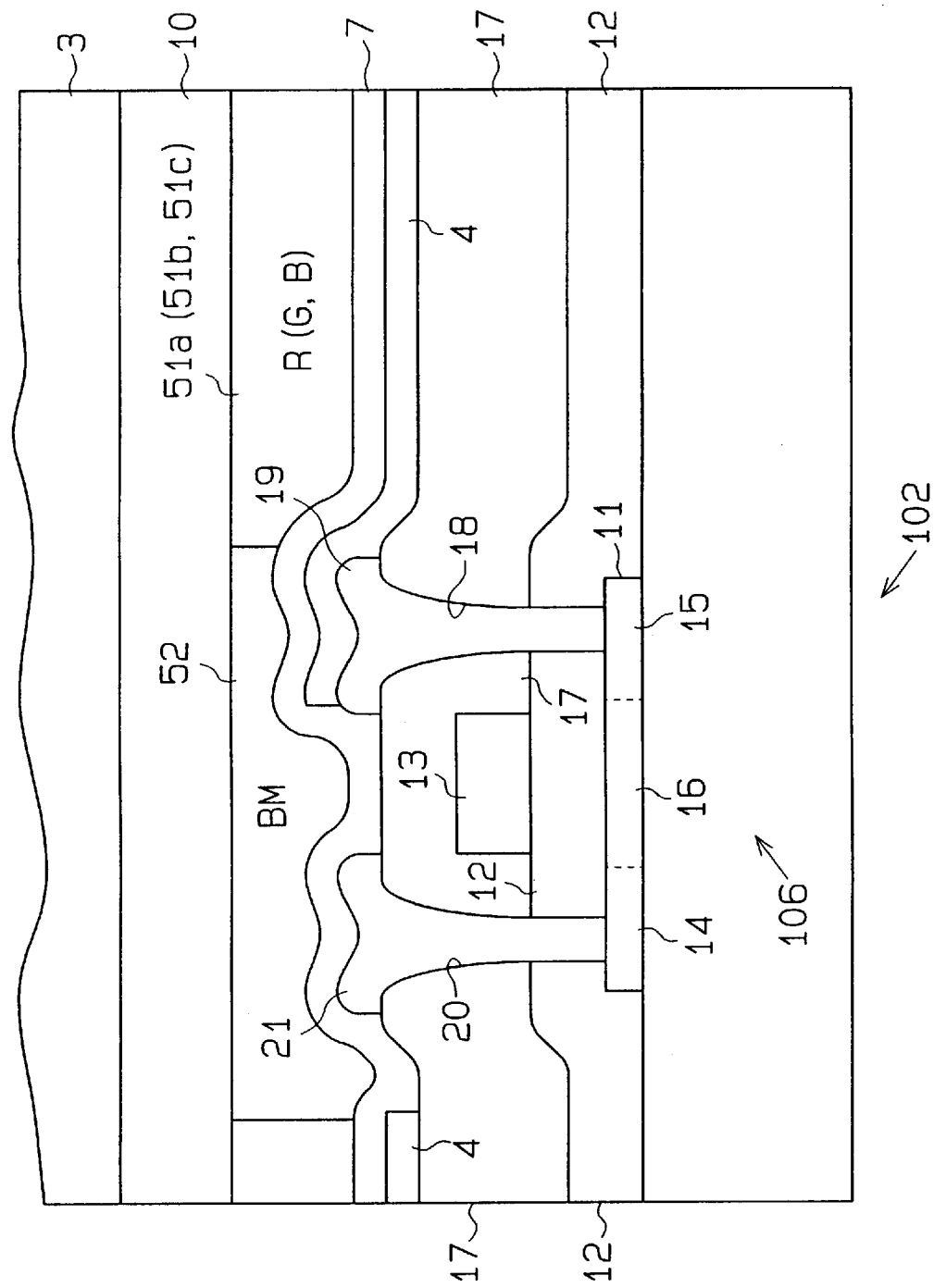
FIG. 10 is a partial enlarged diagram of FIG. 9.

FIG. 9 shows a partial schematic cross section of the pixel portion 101 in the LCD having the on-chip color filters according to the embodiment. FIG. 10 shows an enlarged diagram of a portion near the TFT 106 in FIG. 9.

The third embodiment differs from the first embodiment shown in FIGS. 3 and 4 with respect to only the following points.

(1) The planarizing insulation film 22 is omitted.

(2) A jaggy portion which occurs due to the fact in (1) on the surface of the device is flattened by color filters 51a to 51c of respective colors of RGB or black matrix 52. That is, the jaggy portion on the surfaces of the display electrodes 4 are flattened by the color filters 51a to 51c of the respective colors RGB and the jaggy portion on the surfaces of portions other than the display electrodes 4 (electrodes 19 and 21 and interlayer insulating film 17) are flattened by the black matrix 52. The film thickness of black matrix 52 is thinner than that of each of the color filters 51a to 51c.

The manufacturing method according to this embodiment will now be sequentially explained.

Process 1: it is the same as the process 1 in the first embodiment.

Figure 11:
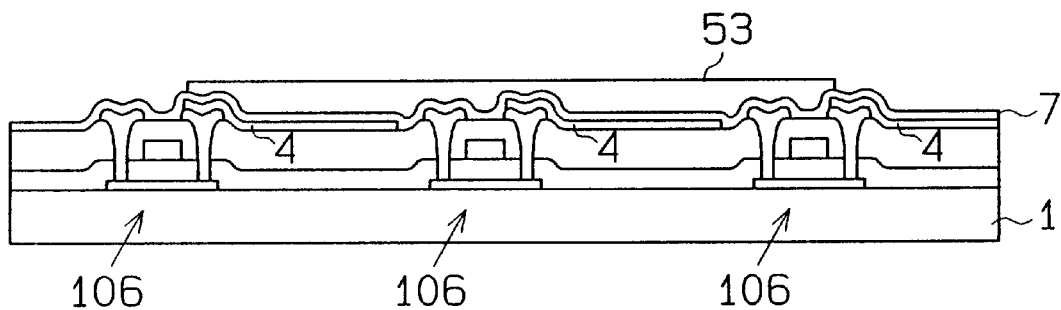
FIG. 11(a) to FIG. 11(c) are partial schematic cross sectional views for explaining a method of manufacturing the display apparatus the third embodiment.
Figure 11:
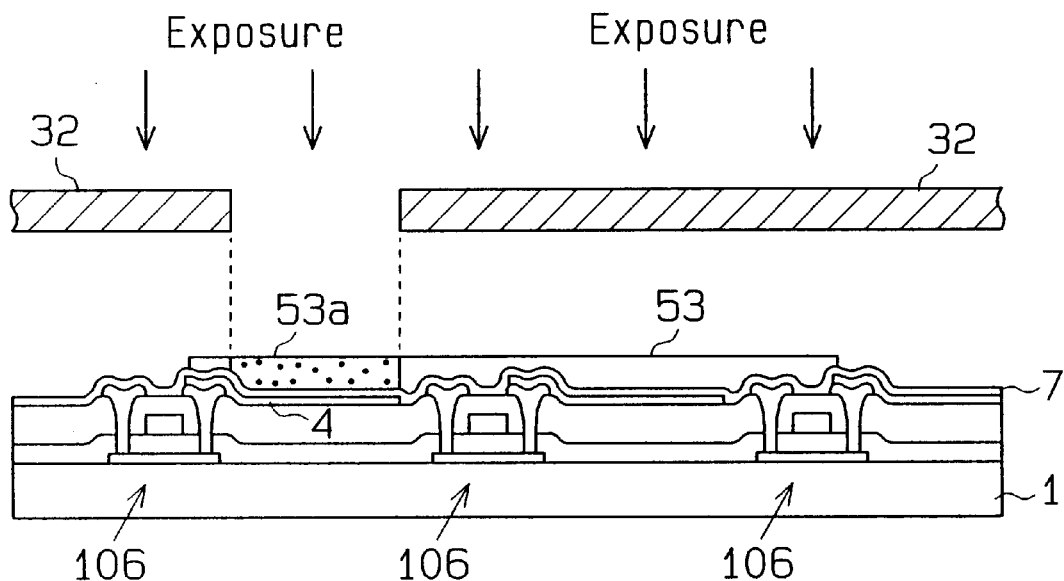
Figure 11:
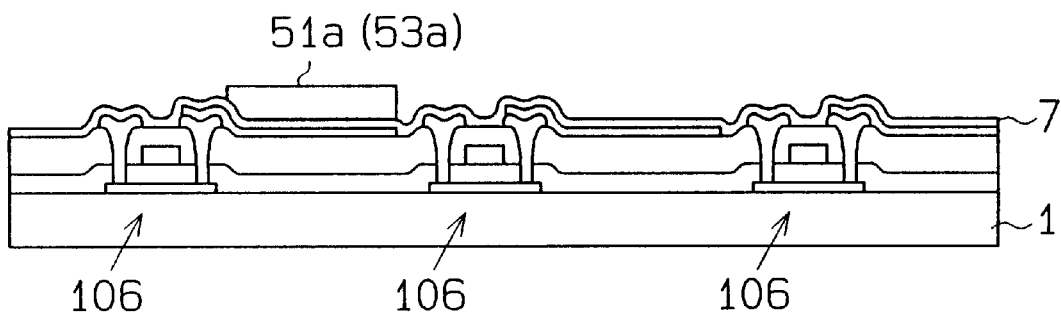

Process 2 [refer to FIG. 11(a)]: a red photosensitive high polymer color film (film resist) 53 (film thickness: about 2.0 μm) is adhered onto the passivation film 7. The specific method is the same as that of the photosensitive high polymer color film 31.

Process 3 [refer to FIG. 11(b)]: the photosensitive high polymer color film 53 is exposed through the photomask 32 having a pattern corresponding to the color filters 51a of R, thereby photosensitizing a portion 53a of the photosensitive high polymer color film 53 corresponding to the color filter 51a.

Process 4 [refer to FIG. 11(c)]: the developing process is performed on the photosensitive high polymer color film 53, thereby forming the color filter 51a of R from the portion 53a.

Figure 12A:
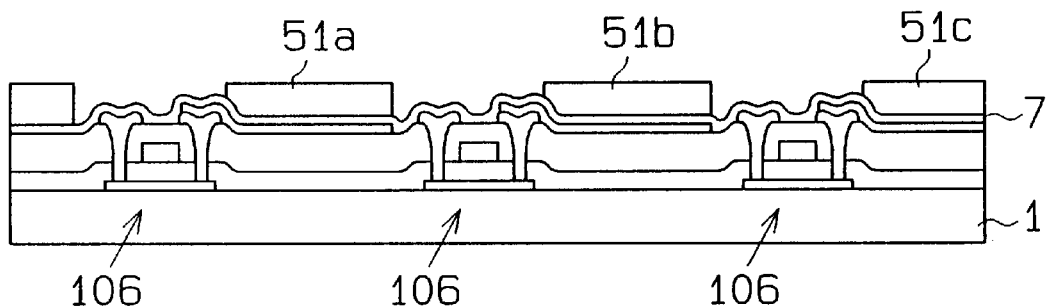
FIG. 12(a) to FIG. 12(c) are partial schematic cross sectional views for explaining the method of manufacturing the display apparatus of the third embodiment.

Process 5 [refer to FIG. 12(a)]: in a manner similar to the processes 2 to 4, the color filter 51b of G is formed from the green photosensitive high polymer color film and the color filter 51c of B is formed from the blue photosensitive high polymer color film.

Figure 12B:
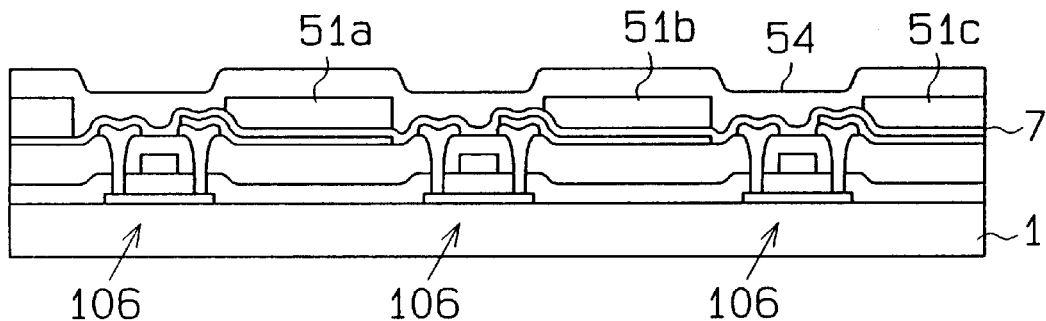

Process 6 [refer to FIG. 12(b)]: a black photosensitive high polymer color film 54 (film thickness: about 1.0 μm) is adhered onto the color filters 51a to 51c of respective colors of RGB and passivation film 7. The adhering method is the same as that of the photosensitive high polymer color film 31.

Figure 12C:
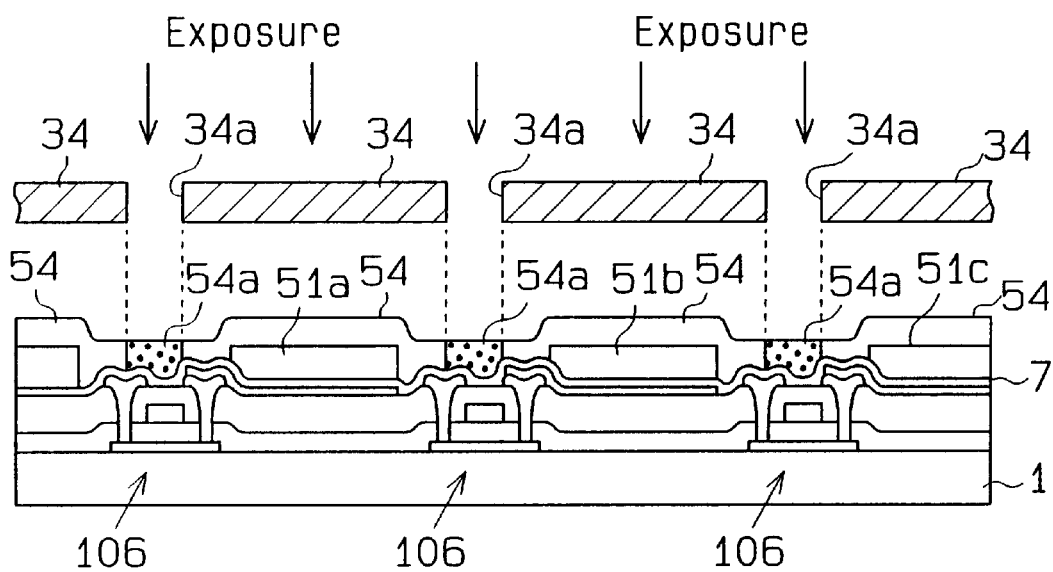

Process 7 [refer to FIG. 12(c)]: the photosensitive high polymer color film 54 is exposed through the photomask 34 having a pattern of the aperture 34a each of which is smaller than that of each of the color filters 51a to 51c of the respective colors RGB and is larger than the opaque material portion such as a gate electrode 13 or the like of the TFT 106, thereby photosensitizing the portions 54a of the photosensitive high polymer color film 54 corresponding to the gaps 34a.

Figure 13A:
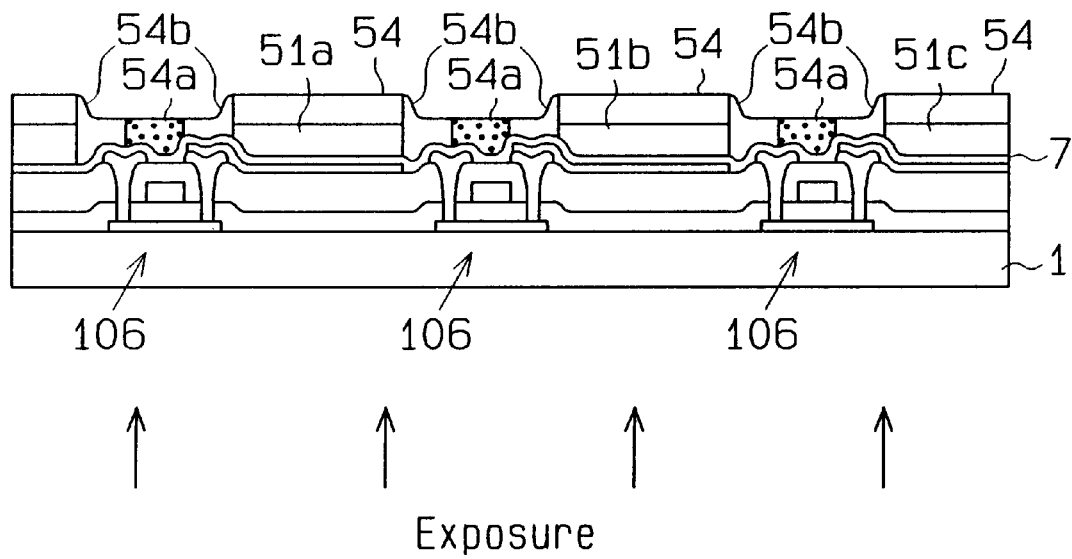
FIG. 13(a) and FIG. 13(b) are partial schematic cross sectional views for explaining the method of manufacturing the display apparatus of the third embodiment.

Process 8 [refer to FIG. 13(a)]: the surface of the transparent insulating substrate 1 on which the TFTs 106 have been formed is exposed from the rear side, thereby photosensitizing portions 54b of the photosensitive high polymer color film 54 sandwiched between the color filters 51a to 51c of the respective colors RGB and the portions 54a of the photosensitive high polymer color film 54. In this instance, since the photosensitive high polymer color film 54 adhered on the color filters 51a to 51c of the respective colors RGB is hardly exposed, only the portions 54b are exposed and photosensitized.

Figure 13B:
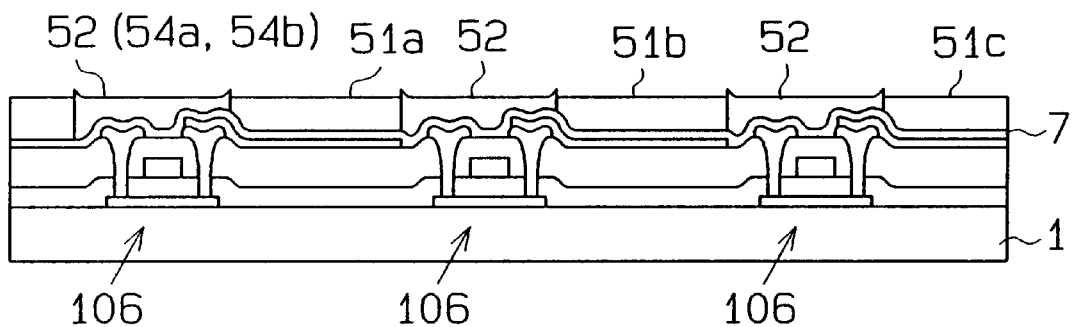

Process 9 [refer to FIG. 13(b)]: by executing the developing process of the photosensitive high polymer color film 54, the black matrix 52 is formed that comprises portions 54a and 54b.

Process 10 (refer to FIG. 9): the orientation film 10 is formed on the color filters 51a to 51c of the respective colors RGB and the black matrix 52. In this instance, the forming temperature of the orientation film 10 is set so as to be lower than the heat resisting temperature of the color filters 51a to 51c and black matrix 52. The process subsequent to the above is the same as the process 10 in the first embodiment.

As mentioned above, according to the embodiment, the operations and effects similar to those in <1> to <3> in the first embodiment can be obtained.

In this embodiment, the film thickness of the black photosensitive high polymer color film 54 is set so as to be thinner than that of each of the red, green, and blue photosensitive high polymer color films 53. Accordingly, the surface of the orientation film 10 can be flattened by the color filters 51a to 51c of the respective colors RGB and the black matrix 52. That is, the height of the display electrode 4 where each of the color filters 51a to 51c is formed is lower than those of the portions (electrodes 19 and 21 and interlayer insulating film 17) other than the display electrode 4. Consequently, when the film thickness of the photosensitive high polymer color film 54 to form the black matrix 52 is set so as to be thinner than that of the photosensitive high polymer color film 53 to form the color filters 51a to 51c, the jaggy portion on the surfaces of the color films 53 and 54 can be flattened. Consequently, the operations and effects similar to those of <6> in the first embodiment are derived.

In this instance, although the embodiments of the present invention have been described, it will be obvious to those skilled in the art that the invention may be embodied in other many specific forms without departing from the spirit and the scope of the invention. Particularly, it should be understood that the invention may be embodied in the following forms.

[1] The TFT 106 is constructed by an LDD (Lightly Doped Drain) structure or a double-gate structure instead of an SD structure.

[2] Impurities are doped into the channel region 16 of the TFT 106, thereby controlling a threshold voltage (Vth) of the TFT 106. In the TFT 106 in which the polysilicon film 11 formed by the solid phase growing method is used as an active layer, there is a tendency that in an n-channel transistor, the threshold voltage is shifted in the depression direction and, in a p-channel transistor, the threshold voltage is shifted in the enhancement direction. Particularly, when the hydrogenating process is executed, the tendency becomes remarkable. In order to restrain the shift of the threshold voltage, it is sufficient that impurities are doped into the channel region 16.

[3] The auxiliary capacitance CS is provided.

[4] The TFT 106 with the planer structure is exchanged for a TFT with the other structure such as inverted planer structure, staggered structure, or inverted staggered structure.

[5] As a TFT 106, the polysilicon TFT is exchanged for the amorphous silicon TFT.

[6] The source electrode 19 and drain electrode 21 are formed by other conductive material except aluminum alloy. As such a conductive material, there are a thin film made of a sole metal of a high melting point, metal compound of a high melting point, metal silicide, doped polysilicon, and the like.

[7] The present invention is applied to not only the active matrix system LCD of the transistor type in which the TFT is used as a pixel driving element but also the active matrix system LCD of a transistor type or a diode type in which a bulk transistor is used as a pixel driving element. As a pixel driving element of the diode type, there are MIM (Metal Insulator Metal), a ZnO (zinc oxide) varistor, an MSI (Metal Semi-Insulator), a BTB (Back To Back diode), an RD (Ring Diode), and the like.

[8] The present invention is applied to an LCD having a reflection type construction.

[9] The passivation film 7 is omitted and the color filters 8a to 8c, 41a to 41c, and 51a to 51c are directly formed on the display electrodes 4.

The above forms and embodiments should be considered as examples and the present invention should not be limited to the specific descriptions disclosed but may be modified within the scope of the appended claims.

What is claimed is:

1. A display apparatus comprising:
   first and second substrates which oppose each other;
   a liquid crystal layer located between said first and second substrates;
   a common electrode formed on said second substrate facing said liquid crystal layer;
   a planarizing insulation film formed on said first substrate facing said liquid crystal layer;
   a plurality of display electrodes of liquid crystal cells (LC) formed on said planarizing insulation film facing said liquid crystal layer;
   a plurality of pixel driving elements connected to said display electrodes; and
   a plurality of on-chip color filters formed on said display electrodes facing said liquid crystal layer, wherein the color filters are constructed of a photosensitive high polymer color film.

2. A display apparatus according to claim 1, wherein aid pixel driving element is a transistor or a diode.

3. A display apparatus according to claim 1, wherein said pixel driving element is a thin film transistor with a structure selected from the group consisting of planar structure, inverted planar structure, staggered structure, and inverted staggered structure.

4. A display apparatus comprising:
   first and second substrates which oppose each other;
   a liquid crystal layer located between said first and second substrates;
   a common electrode formed on said second substrate facing said liquid crystal layer;
   a planarizing insulation film formed on said first substrate facing said liquid crystal layer;
   a plurality of display electrodes of liquid crystal cells (LC) formed on said planarizing insulation film facing said liquid crystal layer;
   a plurality of pixel driving elements connected to said display electrodes;
   a plurality of on-chip color filters of respective colors red, blue and green (RGB) formed on said display electrodes facing said liquid crystal layer, wherein the color filters are constructed of a photosensitive high polymer color film; and
   a black matrix formed between said on-chip color filters, wherein the black matrix is constructed of a photosensitive high polymer color film,
      wherein a film thickness of said black matrix is about the same as a film thickness of each of said on-chip color filters and the surfaces of said black matrix and said on-chip color filters are substantially flattened.

5. A display apparatus comprising:
   first and second substrates which oppose each other;
   a liquid crystal layer located between said first and second substrates;
   a common electrode formed on said second substrate facing said liquid crystal layer;
   a plurality of display electrodes of liquid crystal cells (LC) formed on said first substrate facing said liquid crystal layer;
   a plurality of pixel driving elements connected to said display electrodes;
   a plurality of on-chip color filters of respective colors red, blue and green (RGB) formed on said display electrodes facing said liquid crystal layer, wherein the color filters are constructed; and
   a black matrix formed between said on-chip color filters, wherein the black matrix is constructed of a photosensitive high polymer color film,
      wherein a film thickness of said black matrix is thinner than a film thickness of each of said on-chip color filters and the surfaces of said black matrix and said on-chip color filters are substantially flattened.

6. A method of manufacturing a display apparatus, comprising the steps of:
   forming pixel driving elements on a substrate;
   forming display electrodes connected to said pixel driving elements;

adhering a photosensitive high polymer color film onto said display electrodes; and performing an exposing process and a developing process on said photosensitive high polymer color film in order to form on-chip color filters.

7. A method of manufacturing a display apparatus according to claim 6, further comprising a step of forming a planarizing film on said substrate prior to the formation of said display electrodes.

8. A method manufacturing a display apparatus according to claim 6, further comprising a step of forming an orientation film on said on-chip color filters, and wherein a forming temperature of said orientation film is set to be lower than a heat resisting temperature of said on-chip color filters.

9. A method of manufacturing a display apparatus, comprising the steps of:

forming pixel driving elements on a substrate;

forming display electrodes connected to said pixel driving elements;

adhering a red photosensitive high polymer color film onto said display electrodes;

performing an exposing process and a developing process on said red photosensitive high polymer color film in order to form a red (R) on-chip color filter;

adhering a green photosensitive high polymer color film onto said display electrodes;

performing an exposing process and developing process on said green photosensitive high polymer color film in order to form a green (G) on-chip color filter;

adhering a blue photosensitive high polymer color film onto said display electrodes;

performing an exposing process and developing process on said blue photosensitive high polymer color film in order to form a blue (B) on-chip color filter;

adhering a black photosensitive high polymer color film to the whole surface of a device including said on-chip color filters of the respective colors RGB; and performing an exposing process and developing process on said black photosensitive high polymer color film in order to form a black matrix.

10. A method of manufacturing a display apparatus according to claim 9, wherein said exposing process on said black photosensitive high polymer color film comprises the steps of:

exposing said black photosensitive high polymer color film from the side of said color film through a photomask having a pattern of aperture smaller than those between said on-chip color filters of the respective colors RGB; and back-face exposing said black photosensitive high polymer color film from the side of the rear surface of said substrate using the on-chip color filters as light shielding films.

11. A method of manufacturing a display apparatus according to claim 9, wherein said exposing process on said black photosensitive high polymer color film comprises the steps of:

exposing said black photosensitive high polymer color film from the side of said color film through a photomask having a pattern of aperture each of which is smaller than that between said on-chip color filters and which is larger than an opaque material portion of said pixel driving element; and back-face exposing said black photosensitive high polymer color film from the side of the rear surface of said substrate using the on-chip color filters as light shielding films.

12. A method of manufacturing a display apparatus according to claim 9, further comprising a step of forming a planarizing insulation film on said substrate prior to the formation of said display electrodes.

13. A method of manufacturing a display apparatus according to claim 9, wherein the film thickness of said black matrix is thinner than a thickness of each of said on-chip color filters and the surfaces of said black matrix and said on-chip color filters are substantially flattened.

14. A method of manufacturing a display apparatus, comprising the steps of:

forming pixel driving elements on a substrate;

forming display electrodes connected to said pixel driving elements;

adhering a photosensitive high polymer color film onto said display electrodes; and performing an exposing process and a developing process on said photosensitive high polymer color film in order to substantially simultaneously form on-chip color filters of respective colors red, blue and green (RGB) and a black matrix.

15. A method of manufacturing a display apparatus according to claim 14, further comprising a step of forming a planarizing insulation film on said substrate prior to the formation of said display electrodes.

* * * * *

UNITED STATES PATENT AND TRADEMARK OFFICE
CERTIFICATE OF CORRECTION

PATENT NO. : 6,162,654
DATED : December 19, 2000
INVENTOR(S) : Masahiko Kawabe

It is certified that error appears in the above-identified patent and that said Letters Patent is hereby corrected as shown below:

Column 16, claim 5,
Line 55, after the word "constructed", please insert -- of a photosensitive high polymer color film --.

Column 17, claim 17,
Line 8, after the word "planarizing", please insert -- insulation --.

Column 17, claim 8,
Line 10, after the word "method", please insert -- of --.

Signed and Sealed this

Sixth Day of November, 2001

Attest:

NICHOLAS P. GODICI
Attesting Officer
Acting Director of the United States Patent and Trademark Office

UNITED STATES PATENT AND TRADEMARK OFFICE
CERTIFICATE OF CORRECTION

PATENT NO. : 6,162,654
DATED : December 19, 2000
INVENTOR(S) : Masahiko Kawabe

It is certified that error appears in the above-identified patent and that said Letters Patent is hereby corrected as shown below:

Column 16, claim 5,
Line 55, after the word "constructed", please insert -- of a photosensitive high polymer color film --.

Column 17, claim 7,
Line 8, after the word "planarizing", please insert -- insulation --.

Column 17, claim 8,
Line 10, after the word "method", please insert -- of --.

This certificate supersedes Certificate of Correction issued November 6, 2001

Signed and Sealed this

Fourth Day of June, 2002

*Attest:*

JAMES E. ROGAN
*Attesting Officer*   *Director of the United States Patent and Trademark Office*